United States Patent [19]

Berner

[11] Patent Number: 4,744,409

[45] Date of Patent: May 17, 1988

[54] VALVE ASSEMBLY FOR AIR TREATMENT APPARATUS

[76] Inventor: Erling Berner, Loretohohe 5, CH-6300 Zug, Switzerland

[21] Appl. No.: 18,807

[22] Filed: Feb. 24, 1987

Related U.S. Application Data

[63] Continuation of Ser. No. 761,465, Aug. 1, 1985, abandoned.

[51] Int. Cl.⁴ .............................................. F28D 17/00
[52] U.S. Cl. .......................................... 165/4; 98/32; 137/493.8; 137/512; 137/527.8; 165/54; 165/909
[58] Field of Search ................. 137/512, 493.8, 527.8; 98/32, 34, 34.5, 34.6, 33.1; 165/53, 54, 4, 909

[56] References Cited

U.S. PATENT DOCUMENTS

| 216,804 | 6/1879 | Norton | 137/527.8 X |
|---|---|---|---|
| 588,969 | 8/1897 | Finagin | 98/32 |
| 999,305 | 8/1911 | Gurnett | 137/527.8 |
| 1,270,961 | 7/1918 | Lippert | 137/512 |
| 4,049,404 | 9/1977 | Johnson | 165/54 X |
| 4,111,228 | 9/1978 | Simionescu | 137/512 |
| 4,362,091 | 12/1982 | Cox | 137/512 X |
| 4,391,321 | 7/1983 | Thunberg | 165/54 |
| 4,493,366 | 1/1985 | Ekman | 165/54 |

FOREIGN PATENT DOCUMENTS 1023342 3/1953 France .............................. 137/527.8

*Primary Examiner*—Robert G. Nilson
*Attorney, Agent, or Firm*—Kirkpatrick & Lockhart

[57] ABSTRACT

A valve assembly for use with air treatment apparatus is disclosed. The assembly includes shutter valves disposed in the air flow channels and actuatable by the flow of air therethrough.

2 Claims, 2 Drawing Sheets

VALVE ASSEMBLY FOR AIR TREATMENT APPARATUS

This is a continuation of co-pending application Ser. No. 761,465 filed on Aug. 1, 1985, now abandoned.

BACKGROUND OF THE INVENTION

1. Field of the Invention

This invention relates to a valve assembly for use with air treatment apparatus; that is, apparatus which includes a matrix for exchanging heat and/or humidity present in air flowing therethrough.

2. Description of the Prior Art

With the increased recognition of the need for exchanging stale (and sometimes toxic) air within a room or other enclosure with fresh air from the outside, there have developed a variety of devices for accomplishing that exchange. One such device uses a slowly rotating heat recovery rotor through which parallel, but separate, air streams pass in countercurrent flow. Another such device employs a two-position valve for reversing air flow in ducts leading into the device from the outside.

One type of treatment apparatus has air as part of its operation a step in which air within a room or enclosure is exhausted to the outside. There is, therefore, the possibility, depending upon the structure of the device and its mode of operation, for stale exhaust air to be immediately drawn back into the air exchange device as "fresh" air. This occurrence may result from an inadequate porting arrangement to the outside air where stale air being exhausted remains in the vicinity of the fresh air inlet port or from inordinately long exhaust ducts leading to the outside, thereby creating a situation where stale air, instead of being exhausted to the outside, moves back and forth within an extended duct during cycling of the air exchanging device. A valve system that would minimize the co-mingling of exhaust air and fresh air would be useful in this application.

Another type of air treatment apparatus is one in which air having a relatively high moisture content (high humidity) is dried by passing the air through a matrix that absorbs or adsorbs moisture. This type of apparatus may require reactivation of the matrix when it has reached its moisture gathering capacity; such apparatus could benefit from a valve system that permits air flow in one path while impeding air flow in another path and then reverses.

SUMMARY OF THE INVENTION

The present invention provides a valve assembly that meets the foregoing needs. The valve assembly includes at least a pair of valves, each of the valves being disposed in a path of air flow between the air treatment apparatus and air outside of the apparatus, a first of the valves being urged to the closed position by the flow of air through the apparatus in a first direction while the air flow actuates a second of the valves to the open position, and the second of the valves being urged to the closed position by the air flow through the apparatus in the opposite direction while the air flow actuates the first valve to the open position.

Other objects and advantages of the present invention will become apparent from the following detailed description taken with the accompanying drawings in which:

DETAILED DESCRIPTION OF THE PREFERRED EMBODIMENTS

Figure 1:
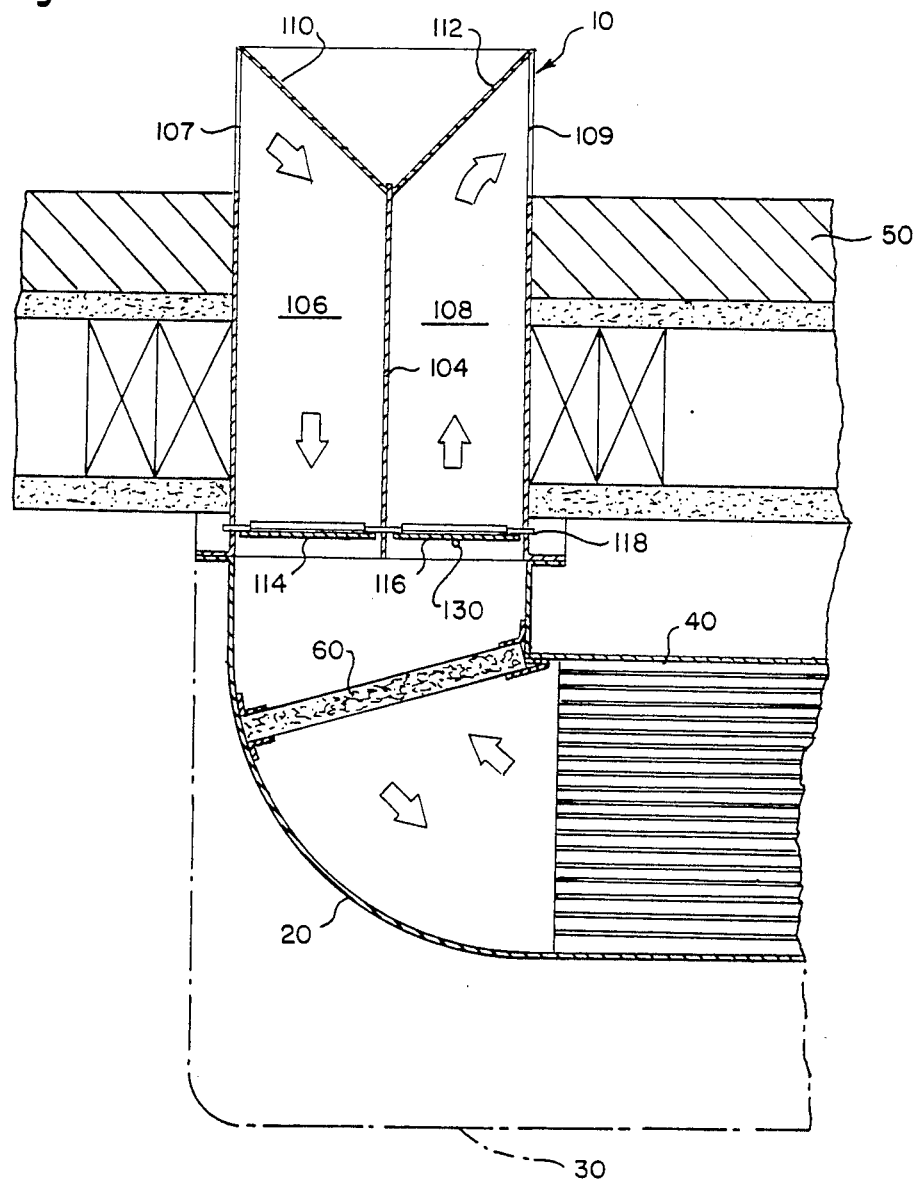
FIG. 1 is a top plan view of an embodiment of the present invention.

Referring to the drawings, there is shown an assembly, generally designated by the reference numeral 10, constructed in accordance with the present invention. Assembly 10 is shown in the drawings as installed in the duct 20 which leads from an air exchanging unit 30 (only part of which is shown in the drawings), such as the unit described in U.S. Pat. No. 4,589,476 owned by the inventor herein. As indicated by the air flow arrows in duct 20, air exchanging unit 30 operates in cyclic fashion so that duct 20 is an intake duct during one part of the cycle and an exhaust duct during the other part of the cycle. The air thus alternatively flows through heat storing matrix 40 of air exchanging unit 30. Duct 20 extends through a wall 50 of an enclosure to the outside. A filter 60 is disposed within duct 20 to prevent the passage of relatively coarse particulate matter.

Because the cycle time of air exchanging unit 30 is about four seconds, there is concern that the same stale room air exhausted through duct 20 during the two second exhaust period will be drawn into duct 20 when the two second intake period commences (and vice-versa with respect to fresh air). The purpose of assembly 10 is to minimize that possibility. It will be understood that while duct 20 is shown as having alternating air flow, it could be a dedicated exhaust duct from an air exchanging unit which cycles to intermittently exhaust air through that dedicated duct.

Assembly 10 is adapted to mate with the duct 20. Assembly 10 comprises a boxlike structure having a central partition 104 which divides assembly 10 into two separate air flow channels 106, 108. Channel 106 serves as the flow channel for intake fresh air drawn from the outside through port 107 and channel 108 serves as the flow channel for stale room air being exhausted to the outside through port 109. Ports 107, 109 are arranged to be divergent from one another to minimize co-mingling of air flowing through each port. Baffles 110, 112 extend from the distal ends of ports 107, 109, respectively, to the distal end of partition 104; these angularly arranged baffles serve to smoothly transition air flowing in channels 106, 108 through a ninety degree turn with respect to ports 107, 109.

Figure 2:
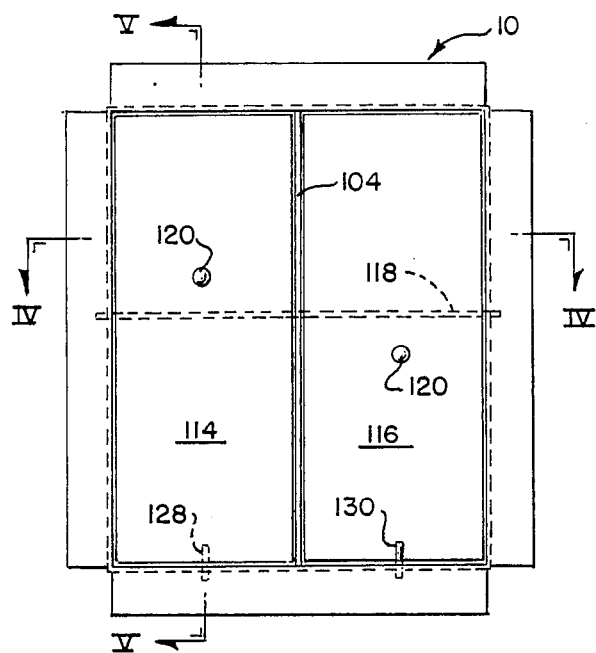
FIG. 2 is a front elevational view of the assembly shown in FIG. 1 as viewed from the bottom of that figure.
Figure 3:
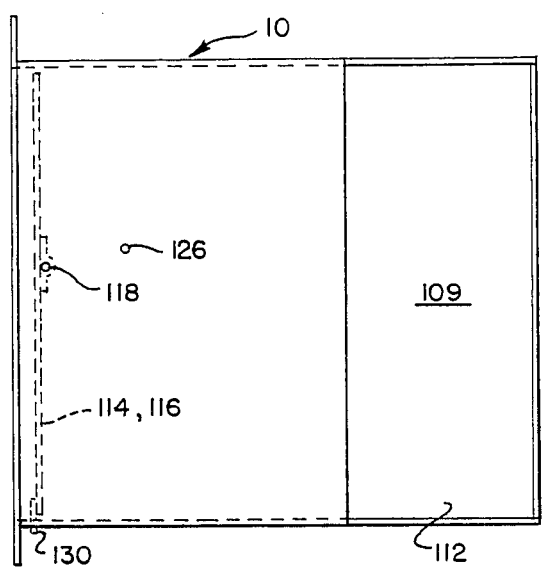
FIG. 3 is a side elevational view of the FIG. 1.
Figure 4:
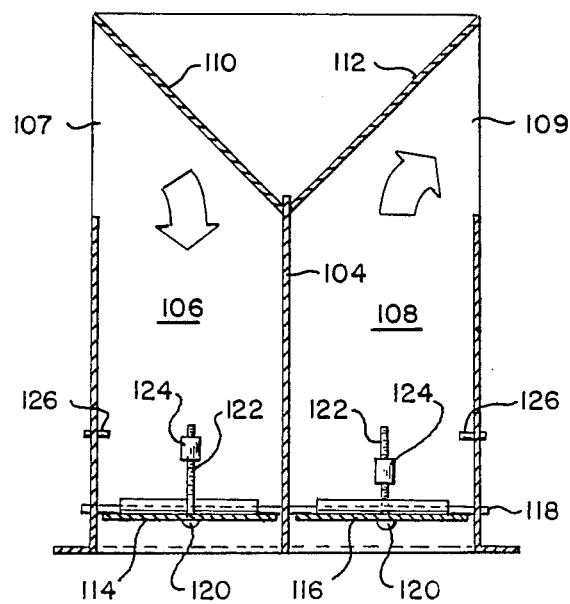
FIG. 4 is a sectional view taken along the line IV—IV of FIG. 2.

Disposed adjacent the inboard ends of air channels 106, 108 are a pair of pivotally mounted shutters 114, 116. As best shown in FIG. 2, shutters 114, 116 are pivoted on a horizontal axis 118 upwardly displaced from the vertical midpoint of assembly 10. Each of shutters 114, 116 has a counterweight assembly 120 comprising a bolt or screw member 122 with an axially movable weight 124 either slidably or threadedly mounted thereon. Mounted in each of the sidewalls of assembly 10 is a stop pin 126 which prevents the associated shutter from rotating more than ninety degrees.

Figure 5:
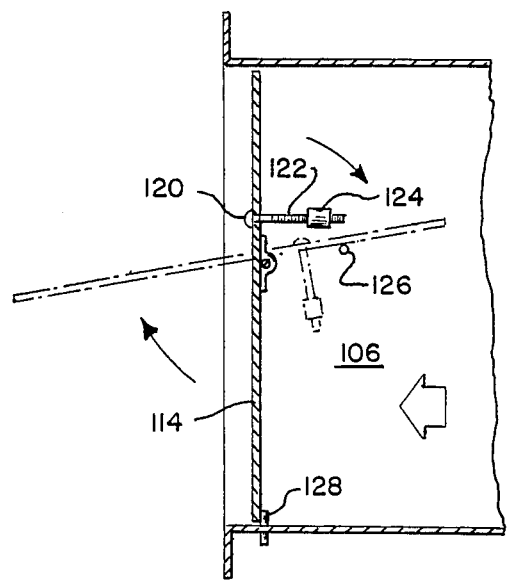
FIG. 5 is a fragmentary section view taken along the line V—V of FIG. 2.

When air exchanging unit 30 is operating in the fresh air intake mode, the force of the air flowing in intake channel 106 (the flow being brought about by a fan not shown) strikes intake shutter 114 and causes the bottom portion of shutter 114 to rotate upwardly (see FIG. 5). Exhaust shutter 116, on the other hand, is prevented from rotational movement by the presence of lug 130 and the location of counterweight 120 below the pivotal axis of shutter 116; thus there is no air flow in exhaust channel 108. The static pressure differential across exhaust shutter 116 during air flow in channel 106 aids in urging exhaust shutter 116 to the closed position. Counterweight 120 on intake shutter 114 may be adjusted to assure that shutter 114 moves easily by adjusting weight 124 away from shutter 114 as the force of the intake air is diminished. Shutter 114 is prevented from overtravel by stop pin 126. When the intake cycle is completed and air ceases to flow from port 107, the offset pivotal mounting causes shutter 114 to return to its vertical position where it is stopped from further rotation by lug 128.

As the exhaust cycle is commenced in air exchanging unit 30, air flowing through duct 20 (by the action of a fan not shown) strikes shutters 114, 116. Shutter 114 is prevented from inward rotation by lug 128 so no air flows through intake channel 106. Shutter 116, on the other hand, is free to rotate and does so by the bottom portion swinging into exhaust channel 108 and upwardly against its corresponding stop pin 126. The movement of shutter 116 can be aided by moving the weight 124 on its counterweight assembly 120 closer to shutter 116. When the exhaust cycle ends, shutter 116 returns to its vertical position against lug 130, aided by the presence of counterweight assembly 120. It thus may be seen that assembly 10 minimizes the mingling of stale exhaust air with the source of fresh intake air.

It will be appreciated by those skilled in the art that intake and exhaust channels 106, 108 may be physically separated from each other when conditions so require; nevertheless, the actuation of shutters 114, 116 in response to air flow through those channels occurs in the manner described above.

What is claimed is:

1. In an air treatment apparatus having a heat exchanging matrix disposed within a chamber for alternately giving heat up to and receiving heat from a reversing flow of air across said matrix, the improvement comprising:

ducting disposed between said matrix and a source of intake air, said ducting defining two separate flow channels to said source, a first one of said channels being an intake channel and a second one of said channels being an exhaust channel;

valve means disposed in each of said flow channels at the ends thereof proximate to said chamber and being biased to the closed position, the valve means in said intake channel being actuatable to the open position by air flow in said intake channel and the valve means in the exhaust channel being actuatable to the open position by air flow out of the exhaust channel.

2. The improvement recited in claim 1 which further comprises:

a pair of ports disposed at the ends of said channels distal of the chamber, said ports being divergent from one another to substantially reduce co-mingling of intake and exhaust air.

* * * * *